(12) United States Patent
Aoki et al.

(10) Patent No.: US 7,443,551 B2
(45) Date of Patent: Oct. 28, 2008

(54) DOCUMENT FEEDER AND IMAGE FORMING APPARATUS

(75) Inventors: Masashi Aoki, Hachioji (JP); Tsuyoshi Mizubata, Hachioji (JP); Kiyoshi Hata, Hachioji (JP); Nobutaka Kato, Higashikurume (JP); Osamu Kato, Higashimurayama (JP); Kazuaki Ito, Kawagoe (JP)

(73) Assignee: Konica Corporation, Tokyo (JP)

( * ) Notice: Subject to any disclaimer, the term of this patent is extended or adjusted under 35 U.S.C. 154(b) by 1000 days.

(21) Appl. No.: 10/337,304

(22) Filed: Jan. 6, 2003

(65) Prior Publication Data
US 2003/0137703 A1    Jul. 24, 2003

(30) Foreign Application Priority Data
Jan. 23, 2002  (JP)  ............................. 2002-014527

(51) Int. Cl.
*B65H 5/22*  (2006.01)
*H04N 1/04*  (2006.01)
(52) U.S. Cl. ...................................... 358/498; 271/3.14
(58) Field of Classification Search ................. 358/498, 358/400, 401, 497, 496; 271/225, 186, 3.19, 271/275, 3.14, 265.01; 355/76
See application file for complete search history.

(56) References Cited

U.S. PATENT DOCUMENTS

| 4,761,001 | A | | 8/1988 | Hayakawa et al. |
| 4,933,717 | A | * | 6/1990 | Miura et al. ................... 355/76 |
| 4,975,749 | A | | 12/1990 | Tsunoda et al. |
| 5,090,682 | A | * | 2/1992 | Takimoto ..................... 271/225 |
| 5,651,623 | A | * | 7/1997 | Stodder et al. .............. 400/605 |
| 6,398,212 | B1 | * | 6/2002 | Miyake ..................... 271/186 |
| 6,402,133 | B1 | * | 6/2002 | Miyake ..................... 271/3.19 |

FOREIGN PATENT DOCUMENTS

| JP | 2000-7176 | * | 1/2000 |
| JP | 2000128400 | | 5/2000 |
| JP | 2004007229 | * | 1/2004 |

OTHER PUBLICATIONS

European Search Report EP 03 25 0095.

* cited by examiner

*Primary Examiner*—Jerome Grant, II
(74) *Attorney, Agent, or Firm*—Lucas & Mercanti, LLP

(57) ABSTRACT

A document feeder reads a document at a reading section while conveying the document. The document feeder has a flexible member which is set in a convey path formed in a document feeding section such that the document is always conveyed along the convey path, and which flexes by a passing force of the document, to allow conveyance of the document. The flexible member is formed of a PET sheet, and is adhered to a reading guide member provided to the document feeding section, to close the convey path.

14 Claims, 10 Drawing Sheets

DOCUMENT FEEDER AND IMAGE FORMING APPARATUS

BACKGROUND OF THE INVENTION

1. Field of the Invention

The present invention relates to a document feeder which can convey a document and enable image reading in order to form an image with an image forming apparatus such as an electrophotographic copying machine, a printer, a facsimile apparatus, a multifunctional machine having a plurality of these functions, or a printing machine, and an image forming apparatus.

2. Description of the Prior Art

In some document feeder provided to such a digital image forming apparatus, documents placed on the sheet feed tray are separated one by one and conveyed by a document convey section. The documents can then be read by a reading section.

In this document feeder, as shown in FIG. 12, a slit glass plate 101 is arranged in a reading section 100. A reading guide member 102 is arranged at a position opposing the slit glass plate 101. A convey path is formed by a distance 1b3 between the slit glass plate 101 and reading guide member 102. A document conveyed through this convey path is read.

With this arrangement, when a document d which has been clamped by both a pair of pre-reading convey rollers 110 and a pair of post-reading convey rollers 111 passes through the pre-reading convey rollers 110 and is clamped by only the post-reading convey rollers 111, it sometimes flaps in the convey path. This causes fluctuations in convey speed to form a defective image.

SUMMARY OF THE INVENTION

The present invention has been made in order to solve the above inconvenience, and has as its object to provide a document feeder which suppresses flapping of a document in a convey path so that a defective image can be prevented from being formed by fluctuations in convey speed, and an image forming apparatus.

In order to solve the above problem and to achieve the above object, the present invention has the following aspects.

According to the first aspect of the present invention, there is provided a document feeder which conveys a document with a document feeding section and reads the document at a reading section, comprising a flexible member with which the document is always conveyed along a convey path without deviation.

With the document feeder according to this aspect, the document is always conveyed along the convey path. Flapping of the document is suppressed, and fluctuations in convey speed can be reduced with a simple arrangement, so that a defective image can be prevented.

According to the second aspect of the present invention, in the document feeder according to the first aspect, the flexible member is attached to close the convey path.

With the document feeder according to the second aspect, since the flexible member is attached to close the convey path, flapping of the document is suppressed with a simple arrangement, so that fluctuations in convey speed can be reduced.

According to the third aspect of the present invention, in the document feeder according to the first or second aspect, the flexible member is a PET sheet.

With the document feeder according to the third aspect, the flexible member is a PET sheet, so the cost is low.

According to the fourth aspect of the present invention, there is provided an image forming apparatus comprising a document feeder according to any one of the first to third aspects.

The image forming apparatus according to the fourth aspect comprises a document feeder according to any one of the first to third aspects, which suppresses flapping of a document in a convey path, so that a defective image can be prevented from being formed by fluctuations in convey speed.

The above and many other objects, features and advantages of the present invention will become manifest to those skilled in the art upon making reference to the following detailed description and accompanying drawings in which a preferred embodiment incorporating the principle of the present invention is shown by way of illustrative examples.

DETAILED DESCRIPTION OF THE PREFERRED EMBODIMENT

A preferred embodiment of the present invention will be described with reference to the accompanying drawings. Note that the present invention is not limited to this embodiment.

Figure 1:
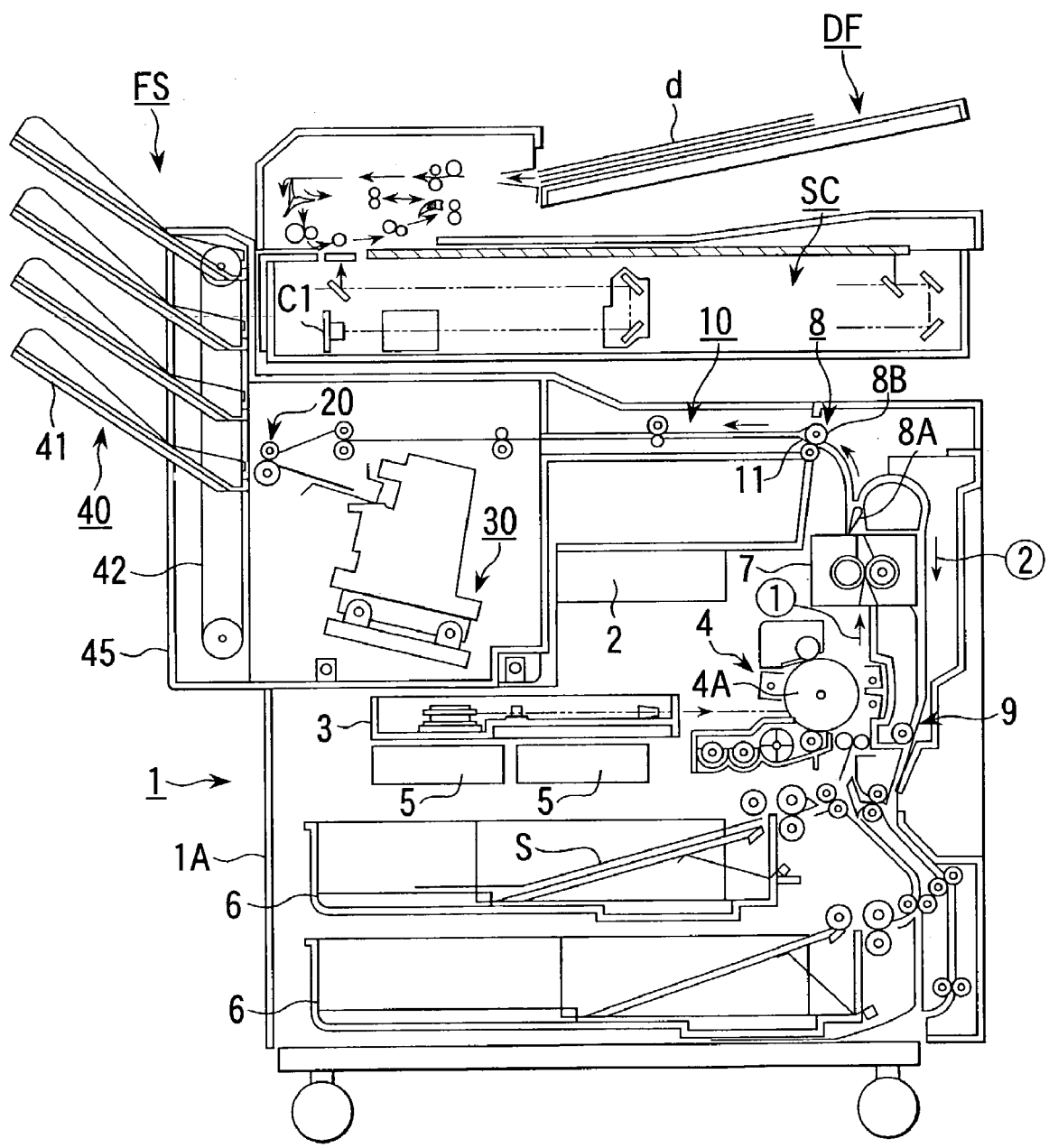
FIG. 1 is a view showing the schematic entire arrangement of an image forming apparatus having a sheet post-processor, document feeder, and image reader.

FIG. 1 is a view showing the entire arrangement of an image forming apparatus 1 having a sheet postprocessor FS, document feeder DF, and image reader (scanner) SC.

An image forming apparatus main body 1A shown in FIG. 1 has an image processing section 2, image writing section 3, image forming section 4, high-voltage power supplies 5, feed cassettes 6, fixing device 7, delivery section 8, and re-conveying means (ADU) 9 for automatic double-sided copying operation.

The image reader SC and document feeder DF are mounted on the upper portion of the image forming apparatus main body 1A. The sheet post-processor FS is connected to the delivery section 8 at the upper left (FIG. 1) of the image forming apparatus main body 1A.

A document d placed on the document table of the document feeder DF with its first side facing up is conveyed in the direction of arrows. An image on the one side of the document or images on the two sides of the document are read by the optical system of the image reader SC, and are loaded by a CCD image sensor C1.

An analog signal obtained by photoelectric conversion of the CCD image sensor C1 is processed by the image processing section 2 in accordance with an analog process, A/D conversion, shading correction, an image compressing process, and the like, and is sent to the image writing section 3.

In the image writing section 3, an output light beam from a semiconductor laser irradiates a photosensitive drum 4A of the image forming section 4 to form a latent image. The image forming section 4 performs processes such as charging, exposure, development, transfer, separation, and cleaning, and the image is transferred to a sheet S conveyed from the corresponding feed cassette 6. The image-bearing sheet S is fixed by the fixing device 7, and is fed from the delivery section 8 to the sheet postprocessor FS. Alternatively, the sheet S, which has been subjected to a single-sided image process and sent to the re-conveying means 9 by a delivery path switching plate 8A, is subjected to a double-sided image process by the image forming section 4 again, and is sent to the sheet postprocessor FS by delivery rollers 8B of the delivery section 8.

The sheet postprocessor FS is detachably mounted at the upper left of the image forming apparatus main body 1A. The sheet postprocessor FS is comprised of a sheet conveying means 10, delivery means 20, post-processing means 30, and vertically movable delivery means 40, which are arranged in a sheet postprocessor main body 45.

Referring to FIG. 1, on the right side in the image forming apparatus main body 1A, the feed cassettes 6, and the fixing device 7 and delivery section 8 are arranged below and above, respectively, the image forming apparatus main body 1A around the image forming section 4 in the direction of height. This vertical array forms a substantially vertical sheet convey path $\hat{1}$. The sheet S sent from each feed cassette 6 is conveyed along the sheet convey path $\hat{1}$ vertically above it and is delivered to outside the image forming apparatus main body 1A.

A sheet convey path $\hat{2}$ is formed by the re-conveying means 9 to be substantially parallel to the vertical sheet convey path $\hat{1}$.

When the vertical sheet convey paths $\hat{1}$ and $\hat{2}$ are formed, a sheet convey path with a minimum distance is formed to extend from the feed cassettes 6 to the delivery section 8.

The sheet conveying means 10 of the sheet postprocessor FS is accommodated in the upper space (in FIG. 1) of the image forming apparatus main body 1A. A sheet inlet 11 of the sheet conveying means 10 is connected to the delivery rollers 8B of the delivery section 8 of the image forming apparatus main body 1A. In this mounting state, the delivery means 20 and postprocessing means 30 of the sheet postprocessor FS are accommodated in the upper left space (in FIG. 1) of the image forming apparatus main body 1A. The vertically movable delivery means 40 formed of a plurality of sheet delivery trays (to be also referred to as bins) 41 and a vertically movable driving means 42 is located on the left side (in FIG. 1) of the postprocessing means 30.

Figure 2:
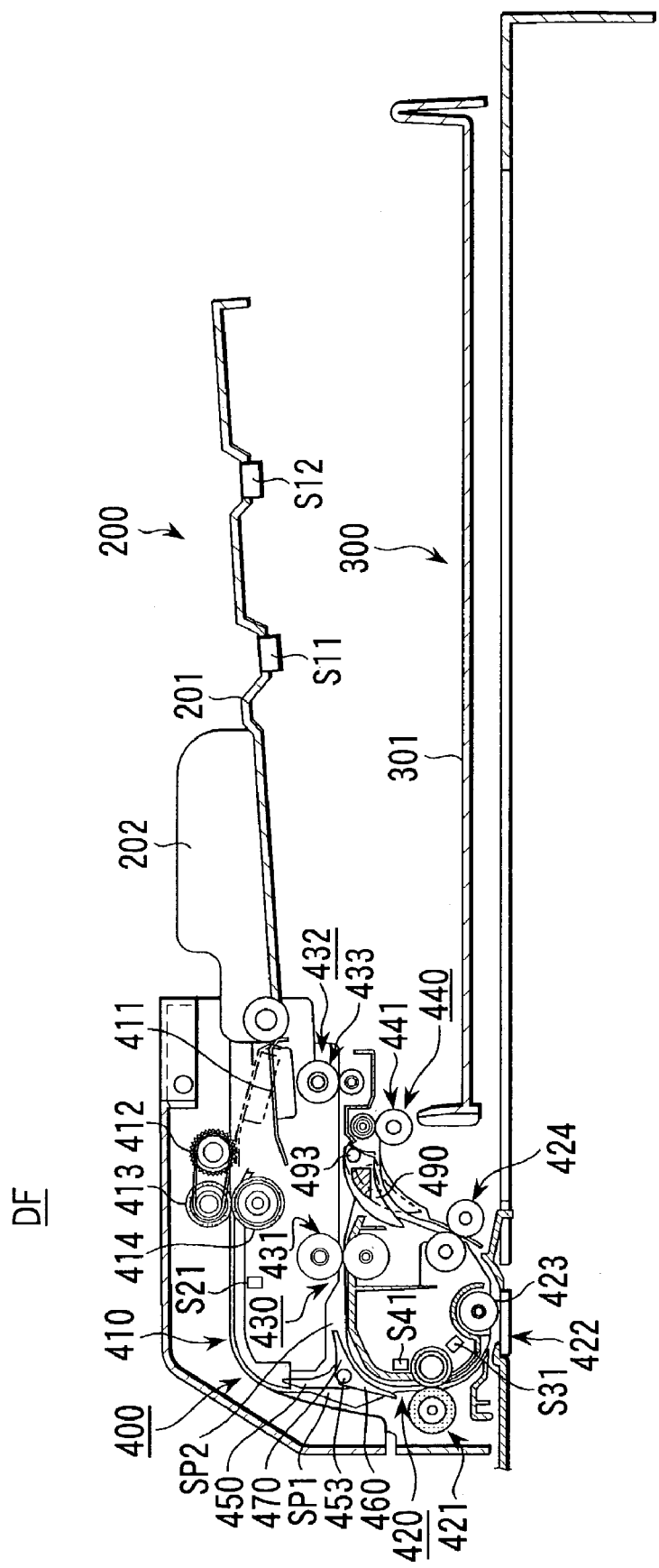
FIG. 2 is a schematic longitudinal sectional view of the document feeder.
Figure 3:
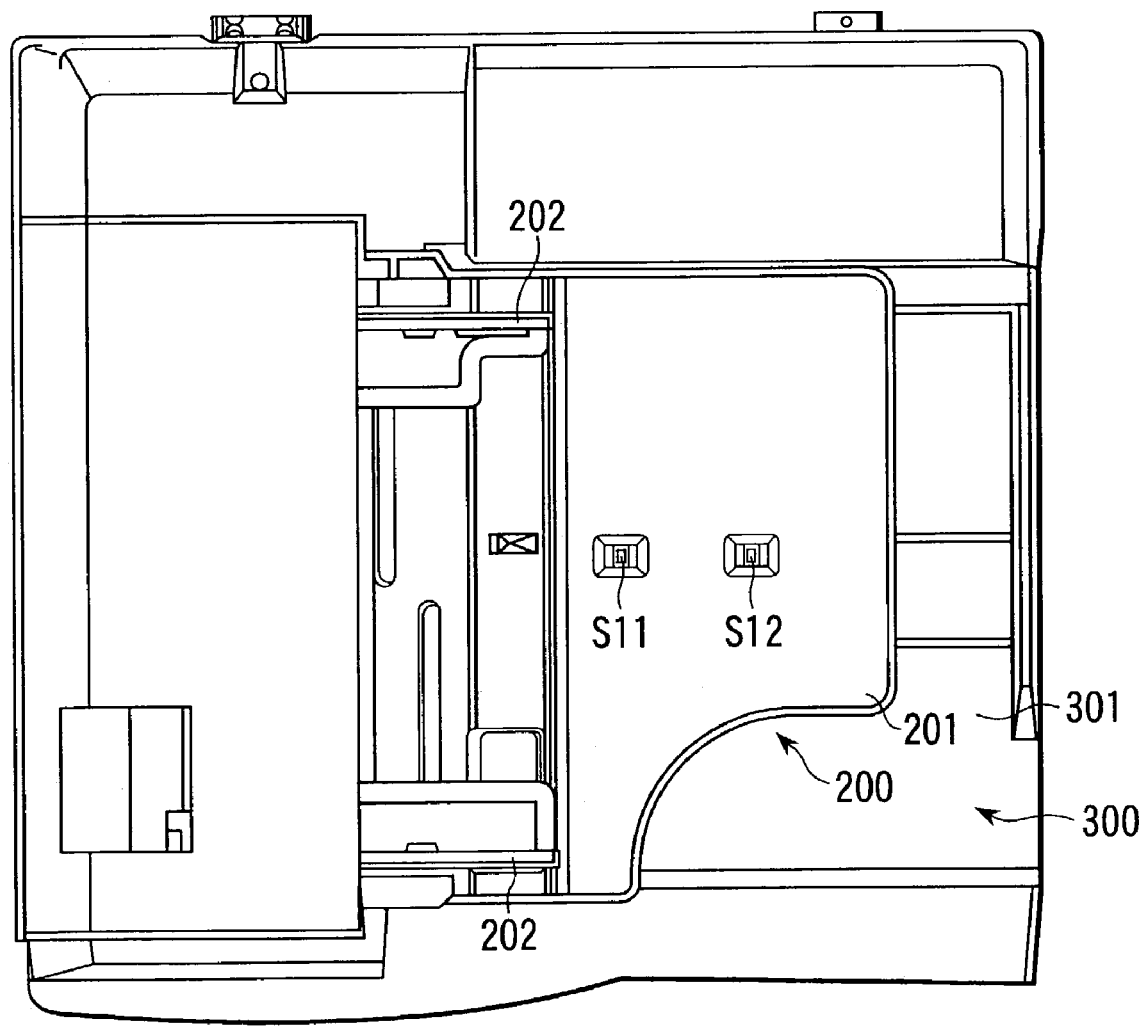
FIG. 3 is a schematic plan view of the document feeder.
Figure 4:
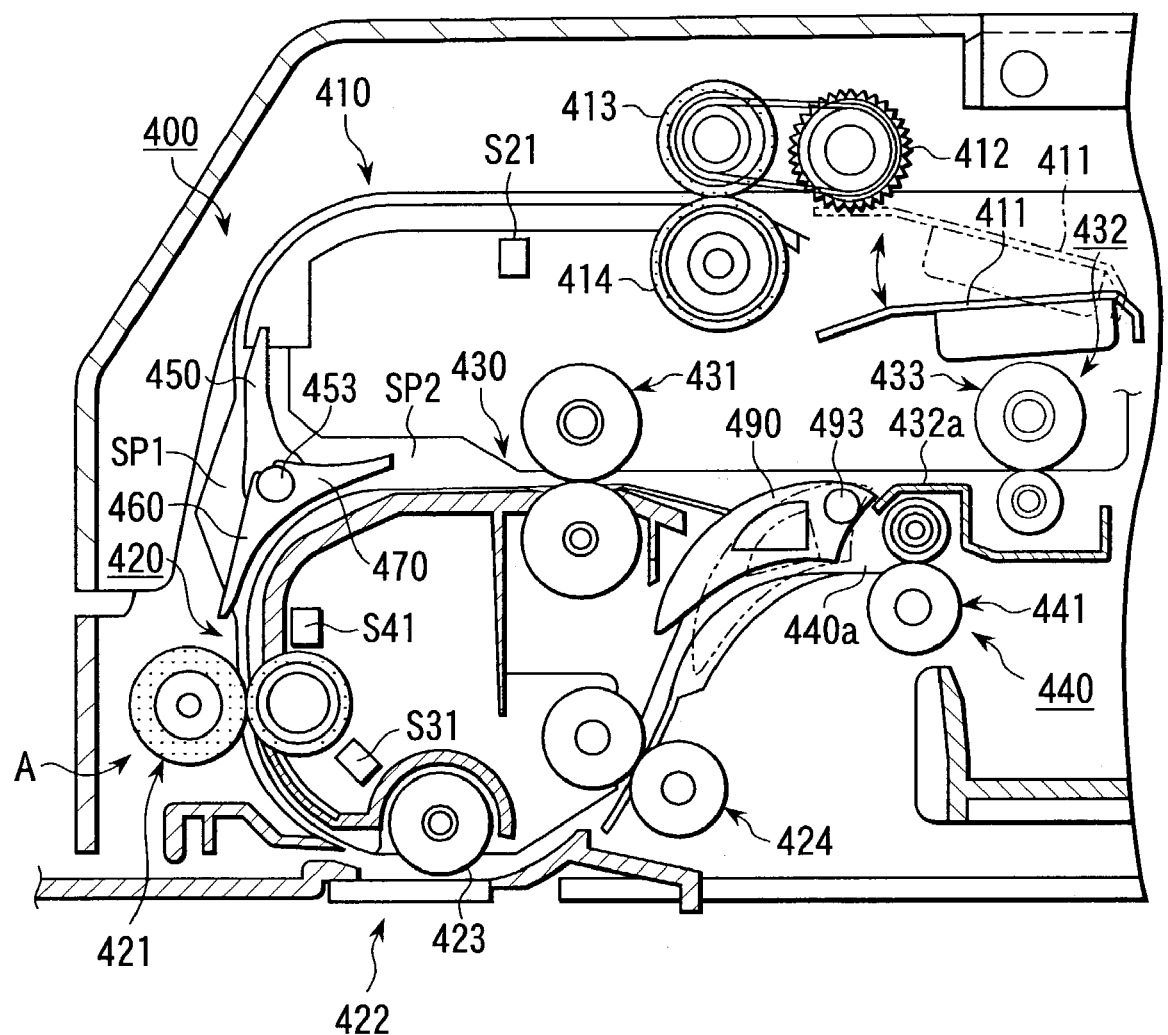
FIG. 4 is an enlarged sectional view of the main part of the document feeder.

As apparent from FIG. 2, a document feeding section 200, document delivery section 300, and document convey section 400 are arranged in the document feeder DF.

The document feeding section 200 has a sheet feed tray 201 on which a plurality of documents can be set. A pair of regulating plates 202 for positioning the documents in the widthwise direction are provided to the sheet feed tray 201 to be movable in the widthwise direction. Two sensors respectively constituting lengthwise direction detecting means S11 and S12 for detecting the lengthwise direction of the document are arranged on the sheet feed tray 201.

The document delivery section 300 has a sheet delivery tray 301 which is arranged below the document feeding section 200. The document which is conveyed by the document convey section 400 such that its one side or two sides will be read is delivered onto the sheet delivery tray 301.

The document convey section 400 has an upstream first convey path 410, downstream branching second and third convey paths 420 and 430, and delivery section 440. A movable press plate 411, pickup roller 412, separating convey roller 413, and double-feed preventive roller 414 are arranged along the first convey path 410. The movable press plate 411 moves up each time a document is fed, and urges the document against the pickup roller 412, so the document is urged against the separating convey roller 413. The separating convey roller 413 and double-feed preventive roller 414 separate the documents one by one and convey the separated documents. A sensor constituting a document length detecting means S21 is arranged downstream of the separating convey roller 413 and double-feed preventive roller 414.

Registration rollers 421, reading section 422, reading press roller 423, and convey rollers 424 are arranged along the second convey path 420. A sensor constituting a document leading end detecting means S31 is arranged downstream of the registration rollers 421. The registration rollers 421, reading press roller 423, and convey rollers 424 can rotate forward in the document convey direction.

Convey rollers 431 and reversing section 432 are arranged along the third convey path 430. The reversing section 432 has reversing rollers 433. The convey rollers 431 and reversing rollers 433 can rotate in the forward and reverse directions. Delivery rollers 441 are arranged in the delivery section 440.

The first convey path 410 has a first switching member 450 which can be switched from the first convey path 410 to the downstream second or third convey path 420 or 430. The first switching member 450 is pivotal together with a support shaft 453. An arm 453a is formed on one end of the support shaft 453, and an arm 453b is formed on the other end of the support shaft 453. The arm 453a is biased by a spring 451. The first switching member 450 opens the second convey path 420 and closes the third convey path 430. The arm 453b is actuated by a solenoid 452 against the spring 451. When the solenoid 452 is actuated, the arm 453b closes the second convey path 420 and opens the third convey path 430.

Integrally formed second and third switching members 460 and 470 are pivotally, axially supported by the support shaft 453. The second and third switching members 460 and 470 are biased by a spring 471. The second switching member 460 opens the second convey path 420, and the third switching member 470 closes the third convey path 430.

The second switching member 460 which is biased from both the first and third convey paths 410 and 430 to one direction to allow conveyance is arranged on the second convey path 420. The second switching member 460 is biased by the spring 471 to allow conveyance from the first convey path 410 and to regulate conveyance from the third convey path 430. When a document is conveyed from the third convey path 430, the second switching member 460 is automatically opened by the document, so that the document can be conveyed.

The third switching member 470 which is biased from both the first and second convey paths 410 and 420 to one direction to allow conveyance is arranged on the third convey path 430. The third switching member 470 is biased by the spring 471 to regulate conveyance from the first convey path 410 and to allow conveyance from the third convey path 430. When a document is conveyed from the first convey path 410, the third switching member 470 is automatically opened by the document, so that the document can be conveyed.

The first, second, and third switching members 450, 460, and 470 can be opened and closed about one support shaft 453 arranged at the merging portion of the first, second, and third convey paths 410, 420, and 430 as a fulcrum. The space for arranging the three switching members together can be reserved easily, enabling downsizing.

Figure 5:
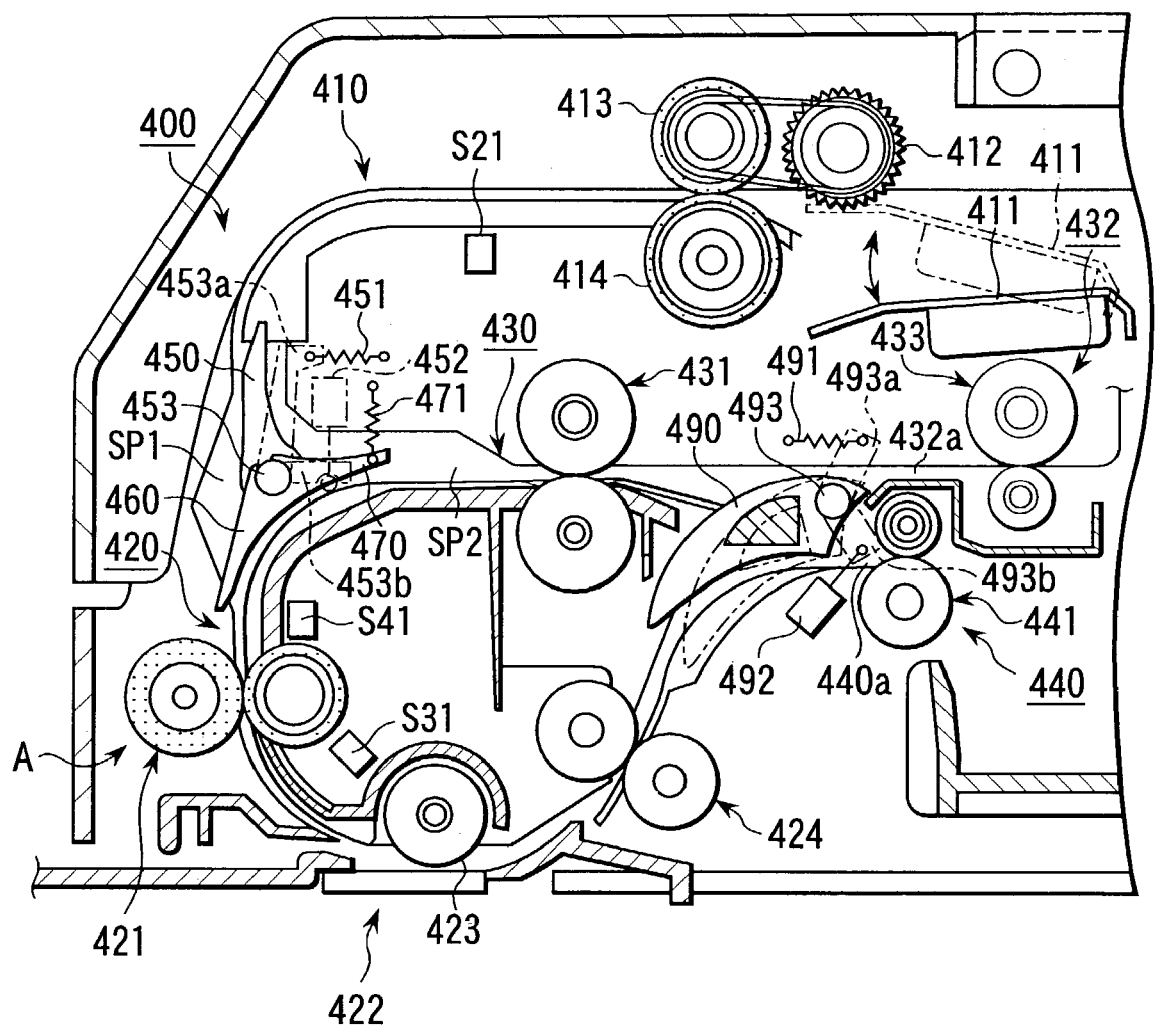
FIG. 5 is an enlarged sectional view showing a convey switching section.

As shown in FIG. 5, a fourth switching member 490 that can allow switching between the reversing section 432 and delivery section 440 is provided downstream of the reading section 422 to be rotatable together with a support shaft 493. An arm 493a is formed on one end of the support shaft 493, and an arm 493b is formed on the other end of the support shaft 493. The arm 493a is biased by a spring 491 to open an inlet 440a of the delivery section 440 and to close an inlet 432a of the reversing section 432. The arm 493b is actuated by a solenoid 492 against the spring 491. When the solenoid 492 is actuated, the arm 493b closes the inlet 440a of the delivery section 440 and opens the inlet 432a of the reversing section 432.

Figure 6:
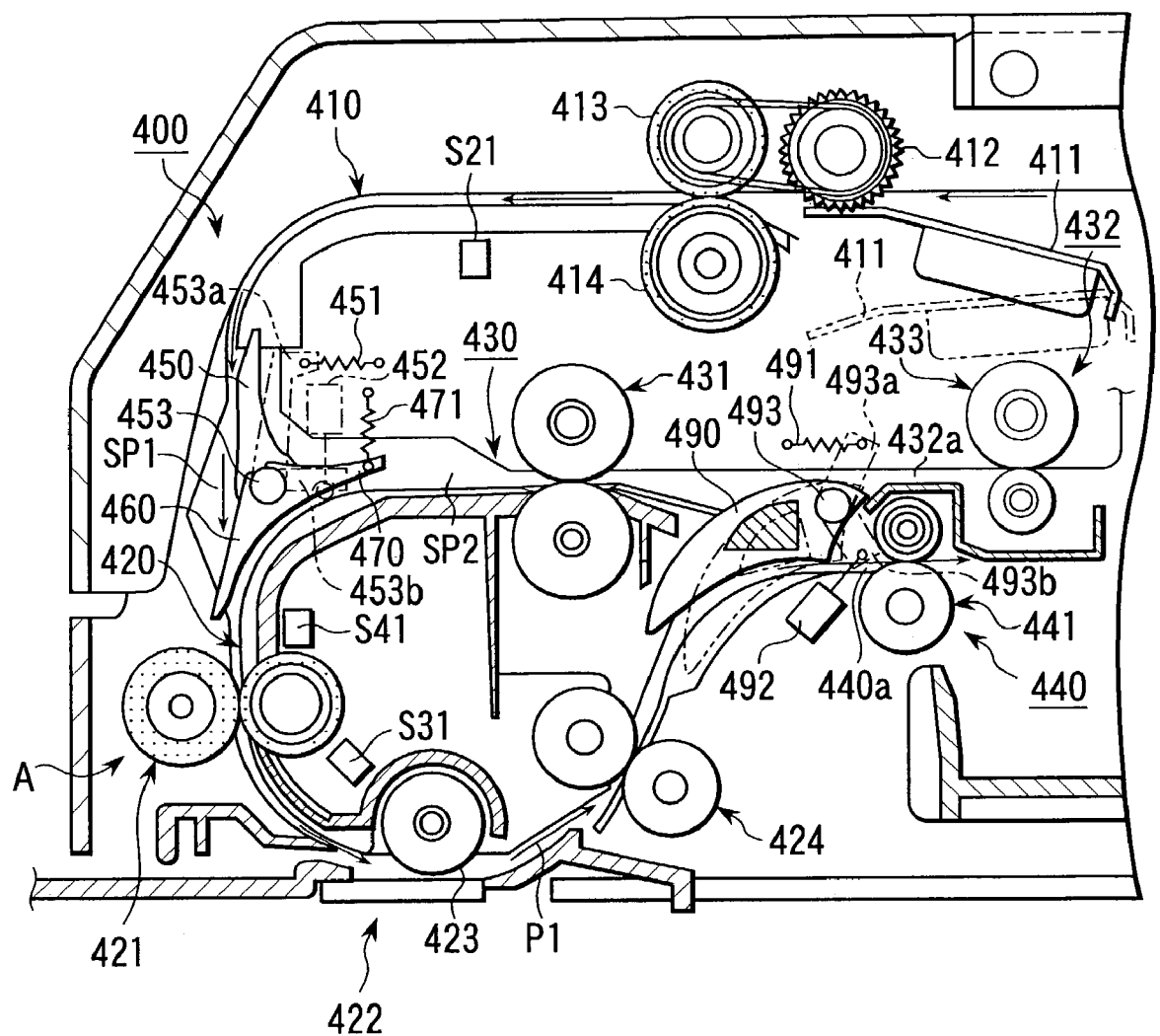
FIG. 6 is an enlarged sectional view showing a single-sided convey path in sheet conveyance.

In this embodiment, when one side of a document d is to be read, the document d is conveyed along a single-sided sheet path P1 along which one side of the document d is to be read and the document d is to be delivered, as shown in FIG. 6.

More specifically, in FIG. 6, the documents d placed on the sheet feed tray 201 are separated and conveyed one by one, and the first switching member 450 closes the third convey path 430. Hence, each document d is conveyed from the first convey path 410 to the second convey path 420, and its one side is read by the reading section 422. The fourth switching member 490 closes the inlet 432a of the reversing section 432 and opens the inlet 440a of the delivery section 440. Hence, the document d which has been read is delivered onto the sheet delivery tray 301 through the delivery section 440.

Figure 7:
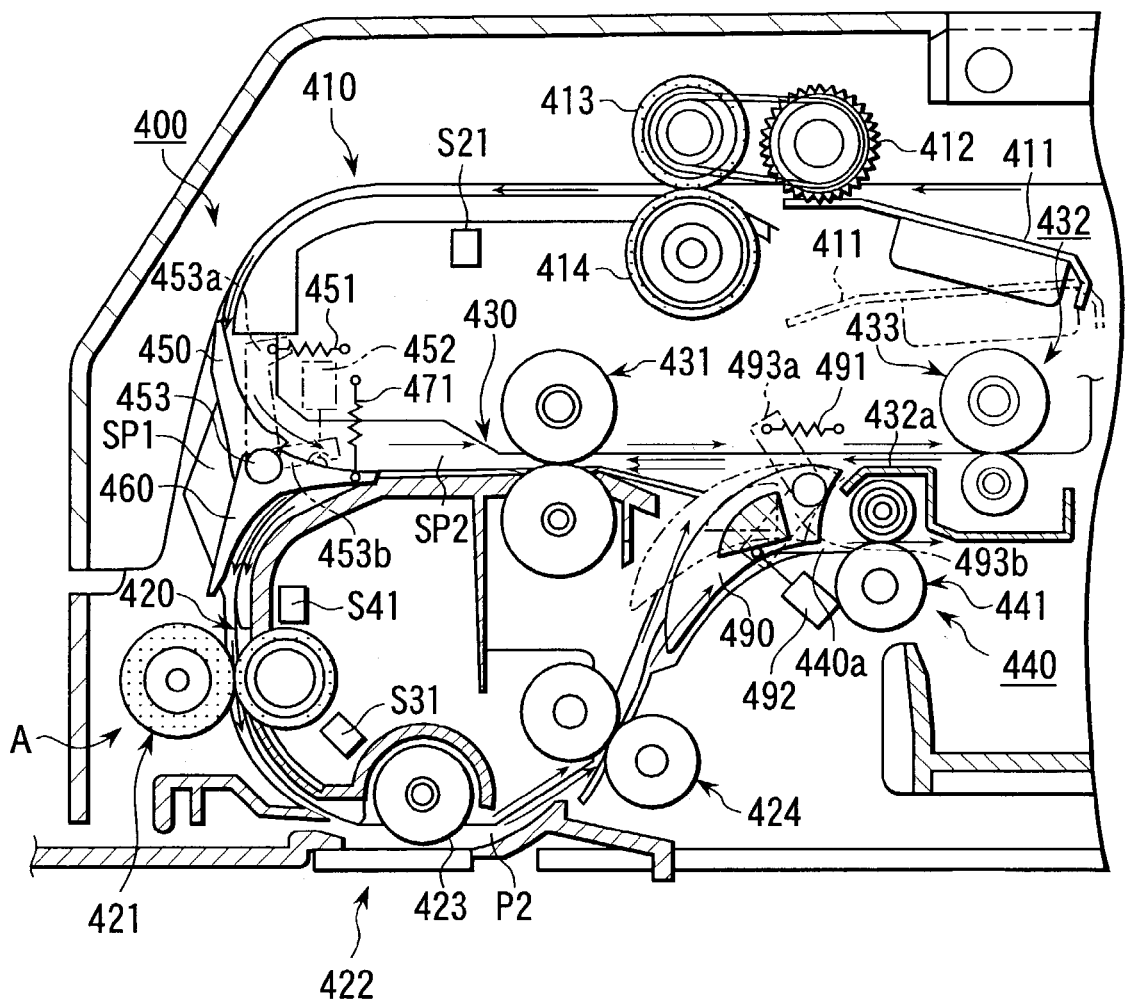
FIG. 7 is an enlarged sectional view showing a double-sided convey path in sheet conveyance.

When the two sides of the document d are to be read, as shown in FIG. 7, the document d is conveyed along a double-sided sheet path P2. Along the double-sided sheet path P2, the document d is guided to the reversing section 432, reversed, and conveyed. One side of the document d is read by the reading section 422, and then the document d is guided to the reversing section 432. The document d is reversed again by the reversing section 432 and conveyed. The other side of the document d is read by the reading section 422, and the document d is delivered.

More specifically, in FIG. 7, the documents d placed on the sheet feed tray 201 are separated and conveyed one by one. The solenoid 452 actuates the first switching member 450 to open the third convey path 430, so the document d is conveyed from the first convey path 410 to the third convey path 430. The third switching member 470 arranged on the third convey path 430 closes the third convey path 430. The third switching member 470 is pushed by the document d which is being conveyed, and opens against the spring 471. When the document d passes, the third switching member 470 closes.

Along the third convey path 430, the convey rollers 431 and the reversing rollers 433 of the reversing section 432 rotate in the forward direction to load the document d. The convey rollers 431 and reversing rollers 433 then rotate in the reverse direction to switch back the document d and convey it. The document d is conveyed from the third convey path 430 to the second convey path 420 through the second and third switching members 460 and 470. One side of the document d is then read by the reading section 422.

When the document d is to be switched back and conveyed, the second and third switching members 460 and 470 are set at the initial position by the spring 471. The document d which is being switched back and conveyed is guided by the third switching member 470 to push the second switching member 460. The second switching member 460 is pushed by the document d which is being conveyed, and opens against the spring 471. When the document d passes, the second switching member 460 closes.

The solenoid 492 actuates the fourth switching member 490 to open the inlet 432a of the reversing section 432 and to close the inlet 440a of the delivery section 440. Hence, the document d which has been read is sent to the reversing section 432 through the inlet 432a of the reversing section 432. The convey rollers 431 and reversing rollers 433 rotate in the reverse direction to switch back the document d and convey it. The document d is then conveyed from the third convey path 430 to the second convey path 420 through the second and third switching members 460 and 470. The other side of the document d is read by the reading section 422.

The fourth switching member 490 closes the inlet 432a of the reversing section 432 and opens the inlet 440a of the delivery section 440. Hence, the document d which has been read is delivered onto the sheet delivery tray 301 through the delivery section 440.

The document feeder that can perform single-sided reading of the document d and double-sided reading of the document d has a document registration mechanism A in which the leading end of the document d is jogged by abutting against a pair of rollers arranged upstream of the reading section 422 and downstream of the reversing section 432. The document registration mechanism A is formed of the registration rollers 421. The document registration mechanism A is arranged upstream of the reading section 422 and downstream of the reversing section 432. The leading end of the document d is jogged by abutting against the pair of rollers of the document registration mechanism A. Thus, any ramp of the document d can be corrected at one location in both single-sided reading and double-sided reading.

A registration loop forming space SP1 for allowing a loop of the document d, which occurs when jogging the document d with the document registration mechanism A, is formed along the single-sided sheet path P1. A registration loop forming space SP2 is formed along the double-sided sheet path P2. A loop of the document d, which occurs when jogging the document d with the document registration mechanism A, is allowed by the registration loop forming spaces SP1 and SP2. Thus, reliable ramp correction can be performed for both single-sided reading and double-sided reading of the document d.

A document position detecting means S41 is arranged upstream of the document registration mechanism A. Since the document position detecting means S41 for detecting the position of the document d is arranged immediately after the merging point of the single-sided sheet path P1 and double-sided sheet path P2, the position of the document d can be detected in both single-sided reading and double-sided reading of the document d.

Figure 8:
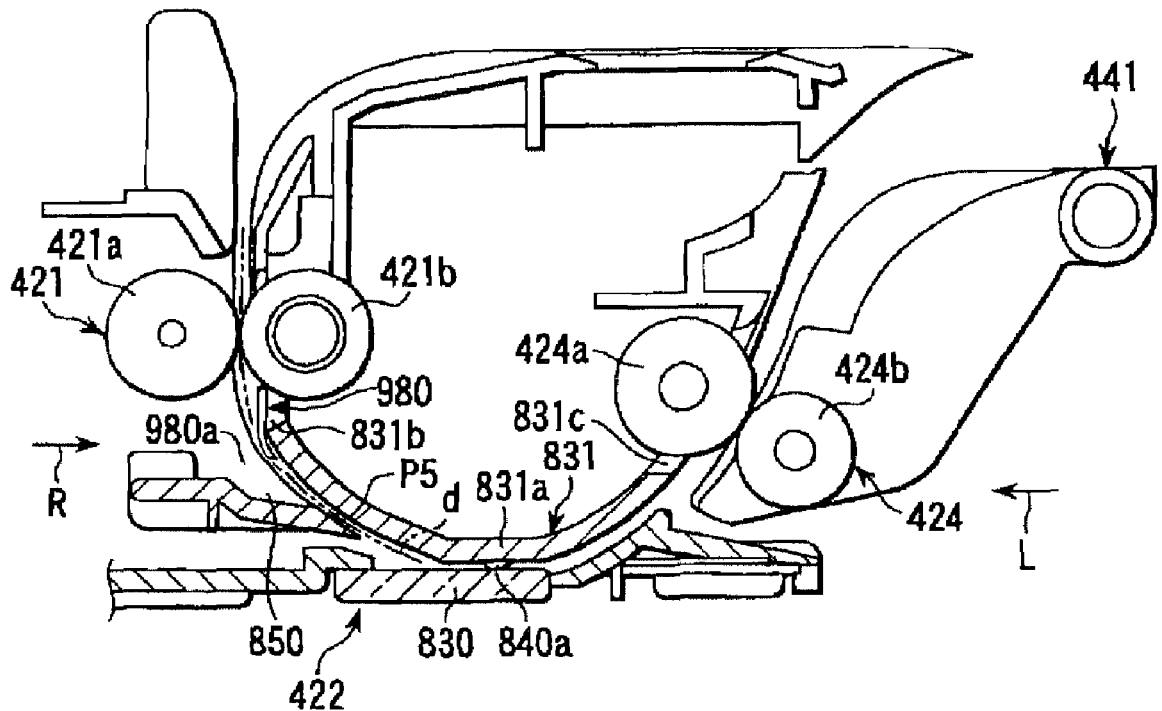
FIG. 8 is an enlarged side view having a partial longitudinal section of an image reading section.
Figure 9:
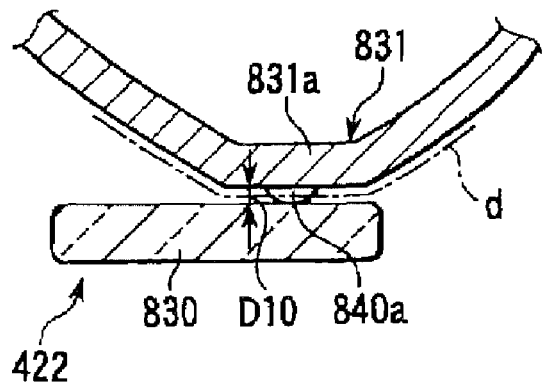
FIG. 9 is an enlarged longitudinal sectional view showing the main part of the side view of the image reading section.
Figure 10:
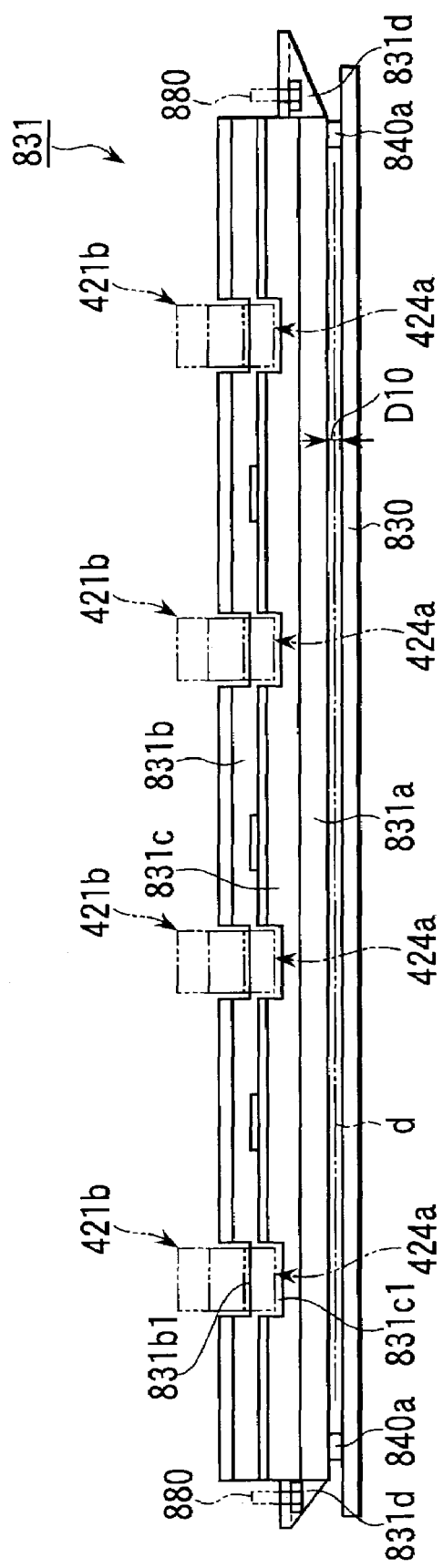
FIG. 10 is a partial view of the image reading section which is seen from the direction of an arrow L of FIG. 8.
Figure 11:
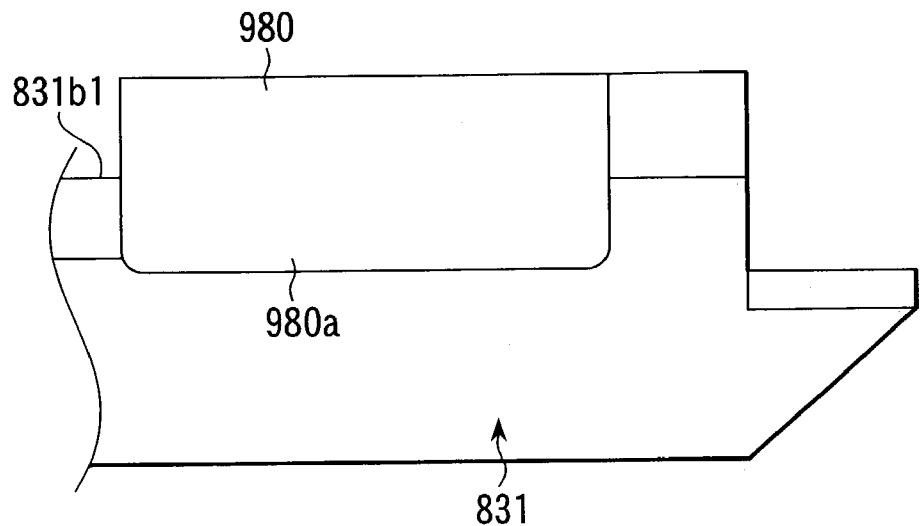
FIG. 11 is a view of the image reading section which is seen from the direction of an arrow R of FIG. 8.
Figure 12:
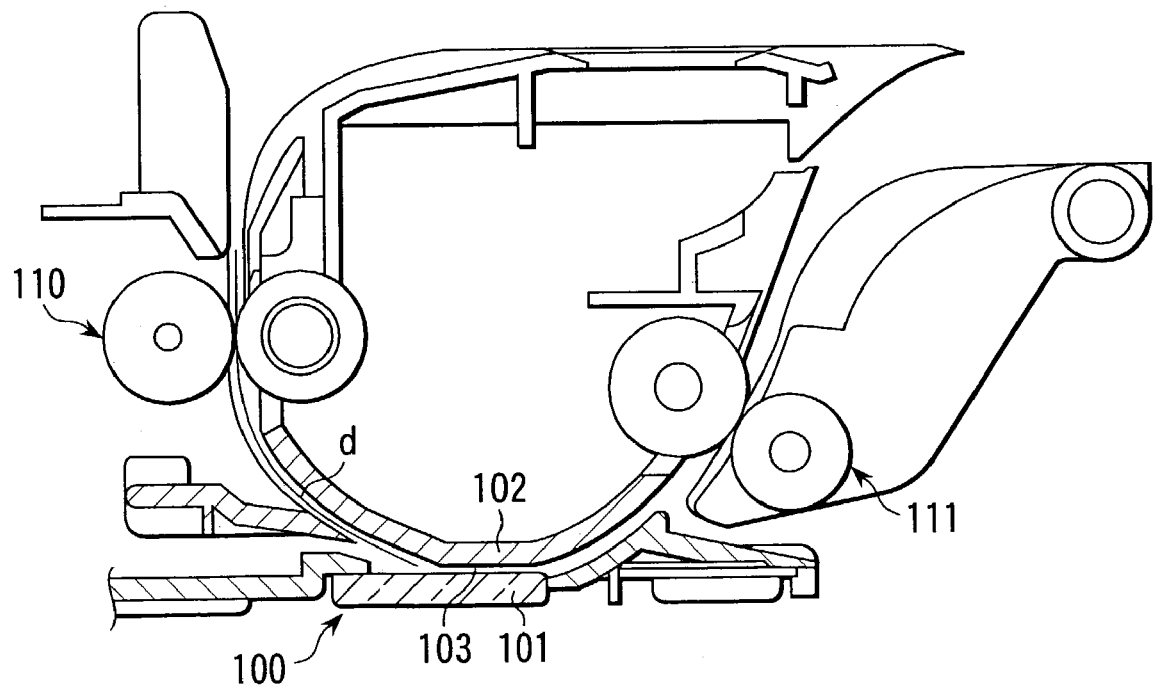
FIG. 12 is an enlarged side view having a partial longitudinal section of a conventional image reading section.

In this embodiment, the reading section 422 is formed as shown in FIGS. 8 to 11. FIG. 8 is an enlarged side view of the reading section. FIG. 9 is an enlarged side view showing the arrangement of the reading guide member and positioning member. FIG. 10 is a view of the reading section which is seen from the direction of an arrow L of FIG. 8. FIG. 11 is a view of the reading section which is seen from the direction of an arrow R of FIG. 8.

A slit glass plate 830 is arranged in the reading section 422 of this embodiment. A reading guide member 831 is arranged to oppose the slit glass plate 830.

The reading guide member 831 is integrally formed of a resin into a plate, and its center 831*a* forms a flat surface that opposes the slit glass plate 830. A front end 831*b* of the reading guide member 831 extends to the position of the registration rollers 421. The front end 831*b* has a notch 831*b*1 where the registration rollers 421 are located. A rear end 831*c* of the reading guide member 831 extends to the position of the convey rollers 424. The rear end 831*c* has a notch 831*c*1 where the convey rollers 424 are located.

The reading guide member 831 has a pair of attaching portions 831*d*, as shown in FIG. 10. The attaching portions 831*d* are attached to the document convey section 400 with fastening means 880 such as machine screws.

The reading guide member 831 has a positioning member 840 that determines the gap between the reading guide member 831 and slit glass plate 830. The positioning member of this embodiment is formed of a pair of projections 840*a* abutting against the slit glass plate 830, as shown in FIG. 10. The pair of projections 840*a* are integrally formed with the reading guide member 831, and are located on two sides of the convey direction of the convey path which is formed by a gap D10 between the center 831*a* and slit glass plate 830 and along which the document d is conveyed.

In this manner, when the reading guide member 831 and the pair of projections 840*a* serving as the positioning member are formed integrally, the number of components can be reduced, and the cost can be reduced. Since the slit glass plate 830 is positioned by the projections 840*a* integral with the reading guide member 831 and serving as the positioning member, assembly errors can be reduced, and the precision of the convey path formed by the gap D10 between the slit glass plate 830 and the center 831*a* of the reading guide member 831 can be improved.

Since the reading guide member 831 is made of a resin and the pair of projections 840*a* serving as the positioning member are formed of a resin to be integral with the reading guide member 831, a further cost reduction becomes possible.

According to this embodiment, a reading guide member 850 is arranged upstream of the reading section 422 in the convey direction to oppose the reading guide member 831. The reading guide member 850 is integrally formed of a resin into a plate. The pair of reading guide members 831 and 850 guide the document d from rollers 421*a* and 421*b*, serving as the registration rollers 421, to the reading section 422.

The roller 421*a* is a driven roller, and the roller 421*b* is a driving roller. The pair of reading guide members 831 and 850 form a convey path P5 with a curvature to extend from the pair of rollers 421*a* and 421*b* to the reading section 422. The document d is conveyed along the convey path P5, and is read by the reading section 422.

According to this embodiment, between the pair of pre-reading rollers 421*a* and 421*b* and the reading section 422, a flexible member 980 is adhered at that position of the reading guide member 831 where the notch 831*b*1 is not formed, that is, to the non-notched portion of the reading guide member 831. As shown in FIGS. 8 and 11, an end 980*a* of the flexible member 980 is attached to close the convey path P5. The end 980*a* of the flexible member 980 flexes by the passing force of the document d, so it allows conveyance. Because of the end 980*a* of the flexible member 980, the document d abuts against the reading guide member 850, so that the document d is always conveyed along the convey path P5.

The flexible member 980 is formed of a low-cost PET sheet, and is arranged at that end 831*b* of the reading guide member 831 which is upstream in the convey direction. Because of the flexible member 980, the document d is always conveyed along the convey path P5. Thus, when the document d which has been clamped by both the pre-reading registration rollers 421 and post-reading convey rollers 424 passes through the pre-reading registration rollers 421 and is supported by only the post-reading convey rollers 424, it can be suppressed from flapping in the convey path P5.

In this manner, the flexible member 980 with which the document d is always conveyed in the convey path P5 along the convey path P5 is formed. The flexible member 980 is attached to close the convey path P5. With this simple arrangement, the document d can be conveyed along the outer surface of the reading guide member 831, and fluctuations in the convey speed can be reduced, thereby preventing a defective image.

In this embodiment, the flexible member 980 is formed between the pre-reading registration rollers 421 and the reading section 422, but the present invention is not limited to this. It suffices as far as the flexible member 980 is arranged such that the document d is always conveyed in the convey path P5 along the convey path P5.

The embodiment of the present invention shows a document feeder connected to a copying machine. The present invention can also be applied to a document feeder which is used in connection with an image forming apparatus such as a printer or facsimile apparatus, a multifunctional machine having a plurality of functions of these image forming apparatuses, a light printing machine, or the like.

What is claimed is:

1. A document feeder which reads a document at a reading section while conveying the document in a document feeding section, comprising:
a flexible member which is set between the reading section and a pair of rollers provided upstream of the reading section in a convey path formed in the document feeding section, said flexible member contacts and presses the document against a wall in the convey path,
wherein said flexible member flexes when the document passes the flexible member to allow conveyance of the document.

2. A document feeder according to claim 1, wherein said flexible member is adhered to a reading guide member provided to the document feeding section, to close the convey path.

3. A document feeder according to claim 1, wherein said flexible member is a PET sheet.

4. A document feeder according to claim 2, wherein said flexible member is a PET sheet.

5. A document feeder according to claim 2, further comprising a positioning member, between the reading guide member and a slit glass plate opposing the reading guide member, to determine a distance between the reading guide member and the slit glass plate.

6. A document feeder according to claim 4, further comprising a positioning member, between the reading guide member and a slit glass plate opposing the reading guide member, to determine a distance between the reading guide member and the slit glass plate.

7. An image forming apparatus comprising a document feeder which reads a document at a reading section while conveying the document in a document feeding section, comprising:
a flexible member which is set between the reading section and a pair of rollers provided on upstream of the reading section in a convey path formed in the document feeding section, the flexible member contacts and presses the document against a wall in the convey path, wherein the flexible member flexes when the document passes the flexible member to allow conveyance of the document.

8. The image forming apparatus according to claim 7, wherein the flexible member is adhered to a reading guide member provided to the document feeding section, to close the convey path.

9. The image forming apparatus according to claim 8, further comprising a positioning member, between the reading guide member and a slit glass plate opposing the reading guide member, to determine a distance between the reading guide member and the slit glass plate.

10. The image forming apparatus according to claim 7, wherein the flexible member is a PET sheet.

11. A document feeder which reads a document at a reading section while conveying the document in a document feeding section, comprising:

a pair of rollers provided upstream of the reading section;

a flexible member which is set upstream of the reading section in a convey path formed in the document feeding section, the flexible member contacts and presses the document against a wall in the convey path, wherein the flexible member flexes when the document passes the flexible member to allow conveyance of the document, and contacts and presses the document while reading the document after a trailing edge of the document passed through the rollers.

12. The document feeder according to claim 11, wherein the flexible member is adhered to a reading guide member provided to the document feeding section, to close the convey path.

13. The document feeder according to claim 12, wherein the flexible member is a PET sheet.

14. The document feeder according to claim 11, wherein the flexible member is a PET sheet.

* * * * *